United States Patent Office 3,368,947
Patented Feb. 13, 1968

3,368,947
PROCESS FOR PRODUCING NICOTINAMIDE
DINUCLEOTIDE
Kiyoshi Nakayama, Sagamihara-shi, and Haruo Tanaka,
Tokyo, Japan, assignors to Kyowa Hakko Kogyo Co.,
Ltd., Tokyo, Japan, a corporation of Japan
No Drawing. Filed Apr. 9, 1965, Ser. No. 447,101
Claims priority, application Japan, Apr. 11, 1964,
39/20,292
14 Claims. (Cl. 195—28)

ABSTRACT OF THE DISCLOSURE

A process for producing nicotinamide dinucleotide by fermentation which comprises culturing the microorganism *Brevibacterium ammoniagenes* in an aqueous nutrient medium under aerobic conditions in the presence of nicotinic acid, nicotinic acid amide, a mixture of nicotinic acid with nicotinic acid amide, adenine and/or a derivative of adenine, such as adenine riboside or adenine ribotide, or a mixture of nicotinic acid amide with adenine and/or a derivative of adenine, accumulating the resultant nicotinamide dinucleotide therein, and recovering the same from the fermentation medium.

This invention relates to the preparation of nicotinamide dinucleotide. More particularly, it relates to a process for the preparation of nicotinamide dinucleotide by fermentation. Even more particularly, the invention relates to a process for producing nicotinamide dinucleotide by fermentation of a nutrient medium containing microorganisms of the type *Brevibacterium ammoniagenes*.

Nicotinamide dinucleotide, well known in the art, is the coenzyme apozymase, necessary for the alcoholic fermentation of glucose. Nicotinamide dinucleotide is also known as coenzyme I, codehydrogenase I, cozymase, and diphosphopyridine nucleotide. Nicotinamide dinucleotide is a compound having an important role in biochemical reactions.

One of the objects of the present invention is to provide a process for producing nicotinamide dinucleotide by a fermentation method on an industrial scale.

Another object of the present invention is to provide a process for the preparation of nicotinamide dinucleotide on an industrial scale which may be carried out efficiently and at low cost.

These and other objects of the present invention will become apparent to those skilled in the art from a reading of the following specification and claims.

In accordance with the present invention, it has been found that the aforementioned advantages may be attained and remarkable amounts of nicotinamide dinucleotide formed if nocitinic acid, nicotinic acid amide, or mixtures thereof or if each or both of these compounds together with adenine and/or its derivatives such as adenine riboside or adenine ribotide are added at appropriate times to a culture medium containing the microorganism *Brevibacterium ammoniagenes* during the fermentation thereof. This measure is unknown in the prior art and the advantageous results effected by the process of the present invention arise from this discovery.

Culture media containing a carbon source such as a carbohydrate, e.g., glucose starch hydrolysate, molasses, etc., or any other conventional carbon source; a nitrogen source such as urea or ammonium salts such as ammonium chloride, ammonium nitrate, etc.; inorganic compounds such as potassium phosphate, magnesium sulfate, potassium chloride, etc.; and natural substances containing nitrogen such as corn steep liquor, yeast extract, meat extract, peptone, fish meal, etc., in appropriate amounts are utilizable in culturing the microorganism employed in the present invention. Such culture media are well known in the art. If strains having specific nutrition requirements are employed, the substances needed to satisfy these particular growth requirements may and should be added to the culture medium.

Pursuant to the present invention, either one or both of nicotinic acid and nicotinic acid amide or these compounds singly or together along with adenine and/or its derivatives are added to the aforementioned culture media. These substances may be added all at one time or intermittently to the culture media during fermentation. Although these compounds may be produced in the culture medium itself, depending upon the characteristics of the strains employed, the addition thereof to the culture medium, in accordance with the process of the present invention, effects a large accumulation of nicotinamide dinucleotide.

The fermentation of the microorganism is conducted under aerobic conditions such as an aerated and stirred submerged culture or with aerobic shaking of the culture. Fermentation is carried out at a culture temperature of 20° to 40° C. and at a pH of 5.5 to 9.0 Great amounts of nicotinamide dinucleotide are accumulated in the culture medium and the cells of the bacteria. Usually, this product is accumulated in said large amounts after an incubation period of from 2 to 8 days.

After completion of the fermentation process, the nicotinamide dinucleotide may be recovered by conventional ion exchange resin treatment or by conventional adsorption methods.

The following examples are given merely as illustrative of the present invention and are not to be considered as limiting.

Example 1

*Brevibacterium ammoniagenes* ATCC 6872 is cultured in a culture medium consisting of 2% glucose, 1% peptone, 1% yeast extract, 0.3% NaCl and 30 micrograms of biotin per liter of water at 30° C. for 24 hours. Then, 10% (by volume) of the resultant culture liquor is inoculated into a fermentation medium. 20 ml. samples of the thusly inoculated fermentation medium are placed into 250 ml. conical flasks and sterilized. Aerobic shaking of the culture is carried out at 30° C.

The fermentation medium has the following composition (per liter of the culture medium):

| | |
|---|---|
| 100 g. glucose | 10 g. $MgSO_4 \cdot 7H_2O$ |
| 6 g. urea | 0.1 g. $CaCl_2 \cdot 2H_2O$ |
| 10 g. $KH_2PO_4$ | 10 g. yeast extract |
| 10 g. $K_2HPO_4$ | 30 μg. biotin |

The fermentation medium is prepared as follows: A 12% solution of urea is prepared and sterilized. 19 ml. of an aqueous solution containing the other components of the fermentation medium is put into a flask and sterilized under pressure conditions of 1 kg./cm.$^2$ for 10 minutes in a pressurized sterilization vessel. The fermentation medium composition is then obtained by mixing equal amounts of the urea solution and of the solution containing the other components together.

After fermentation has continued for 72 hours, nicotinic acid amide is added to the fermentation liquor in the amount of 2 mg. per ml. of liquor. Subsequently, the culture is continued for another 24 hours. At this time, it is found that nicotinamide dinucleotide has accumulated in the fermentation liquor in the amount of 0.91 mg. per ml. of liquor. This product is recovered by a conventional ion exchange resin treatment.

Example 2

This experiment is carried out in the same way as Example 1 except that 2 mg. of adenine per ml. of fermentation liquor is added to the culture medium along with said amounts of nicotinic acid amide. A yield of 1.9 mg. of nicotinamide dinucleotide per ml. of liquor is found to be accumulated in the fermentation liquor.

Example 3

This example is conducted in the same manner as the process described in Example 2 above except that 2 mg. of nicotinic acid per ml. of liquor is added to the fermentation medium, instead of nicotinic acid amide. There is obtained 1.9 mg. of nicotinamide dinucleotide per ml. of fermentation liquor.

Example 4

The same procedure as in Example 2 is carried out except that as the microorganism there is used *Brevibacterium ammoniagenes* ATCC 6871, 15750, and 15751 instead of the *Brevibacterium ammoniagenese* ATCC 6872 used in Example 2. The amount of nicotinamide dinucleotide accumulated is shown in Table 1 below.

TABLE 1

| Brevibacterium ammoniagenes— | Nicotinamide dinucleotide accumulated (mg./ml.) |
|---|---|
| ATCC-6871 | 1.2 |
| ATCC-15750 | 4.0 |
| ATCC-15751 | 4.2 |

The invention being thus described, it will be obvious that the same may be varied in many ways. Such variations are not to be regarded as a departure from the spirit and scope of the invention and all such modifications are intended to be included within the scope of the following claims.

What is claimed is:

1. A process for producing nicotinamide dinucleotide which comprises culturing the microorganism *Brevibacterium ammoniagenes* in an aqueous nutrient medium under aerobic conditions in the presence of a substance selected from the group consisting of nicotonic acid, nicotinic acid amide, a mixture of nicotinic acid with at least one of nicotinic acid amide, adenine and a derivative of adenine, and a mixture of nicotinic acid amide with at least one of adenine and a derivative of adenine, accumulating the nicotinamide dinucleotide in the fermentation liquor and recovering the nicotinamide dinucleotide thus produced.

2. The process of claim 1, wherein said derivative of adenine is adenine riboside.
3. The process of claim 1, wherein said derivative of adenine is adenine ribotide.
4. The process of claim 1, wherein said microorganism is *Brevibacterium ammoniagenes* ATCC 6872.
5. The process of claim 1, wherein said microorganism is *Brevibacterium ammoniagenes* ATCC 6871.
6. The process of claim 1, wherein said microorganism is *Brevibacterium ammoniagenes* ATCC 15750.
7. The process of claim 1, wherein said microorganism is *Brevibacterium ammoniagenes* ATCC 15751.
8. A process for producing nicotinamide dinucleotide which comprises culturing the microorganism *Brevibacterium ammoniagenes* in an aqueous nutrient medium containing a source of carbon and nitrogen under aerobic conditions at a temperature of about 20° to about 40° C. and a pH of about 5.5 to 9.0 in the presence of a substance selected from the group consisting of nicotonic acid, nicotinic acid amide, a mixture of nicotinic acid with at least one of nicotinic acid amide, adenine and a derivative of adenine, and a mixture of nicotinic acid amide with at least one of adenine and a derivative of adenine, accumulating the nicotinamide dinucleotide in the fermentation liquor and recovering the nicotinamide dinucleotide thus produced.
9. The process of claim 8, wherein said derivative of adenine is adenine riboside.
10. The process of claim 8, wherein said derivative of adenine is adenine ribotide.
11. The process of claim 8, wherein said microorganism is *Brevibacterium ammoniagenes* ATCC 6872.
12. The process of claim 8, wherein said microorganism is *Brevibacterium ammoniagenes* ATCC 6871.
13. The process of claim 8, wherein said microorganism is *Brevibacterium ammoniagenes* ATCC 15750.
14. The process of claim 8, wherein said microorganism is *Brevibacterium ammoniagenes* ATCC 15751.

References Cited

UNITED STATES PATENTS 3,268,415  8/1966  Kinoshita et al. _____ 195—28

OTHER REFERENCES

Gunsalus et al.: The Bacteria, vol. III, Academic Press, New York, p. 268, 1962, QR 41 G 78.

ALVIN E. TANENHOLTZ, *Primary Examiner.*